P. Charlier,
Horseshoe.
No. 64,073.    Patented Apr. 23, 1867.
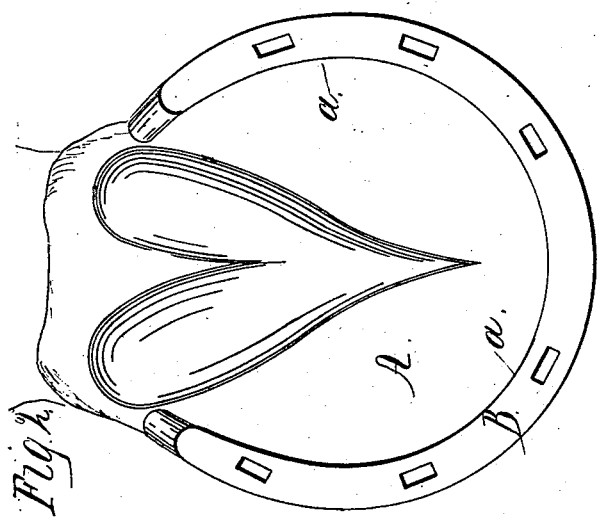
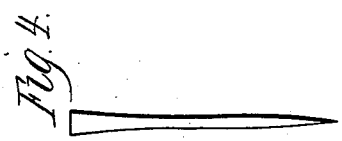
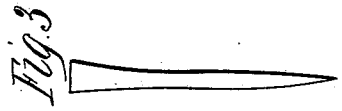
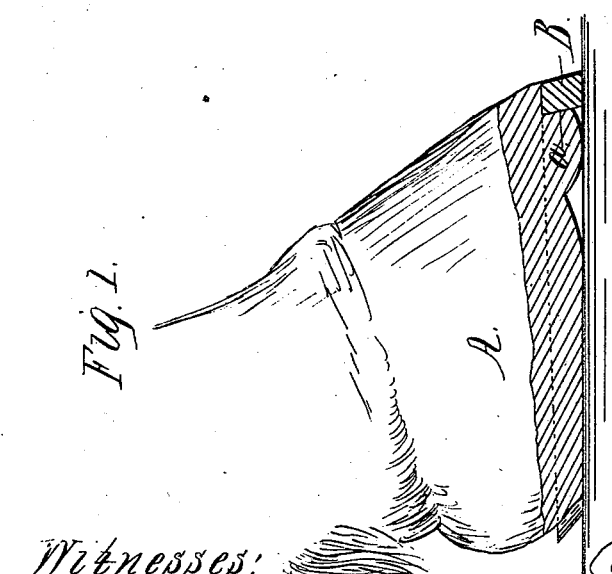
Witnesses:    Inventor:

United States Patent Office.

PIERRE CHARLIER, OF PARIS, FRANCE.

Letters Patent No. 64,073, dated April 23, 1867.

---

IMPROVEMENT IN SHOEING HORSES.

---

The Schedule referred to in these Letters Patent and making part of the same.

---

TO ALL WHOM IT MAY CONCERN:

Be it known that I, PIERRE CHARLIER, of Paris, France, have invented a new and useful Improvement in Shoeing Horses and other animals; and I do hereby declare that the following is a full, clear, and exact description thereof, which will enable others skilled in the art to make and use the same, reference being had to the accompanying drawing, forming part of this specification, in which—

Figure 1 represents a sectional side elevation of this invention.

Figure 2 is an inverted plan of the same.

Figures 3 and 4 are detached views of the nails used in fastening the shoes.

Similar letters of reference indicate like parts.

This invention relates to a new and improved method of applying the shoes to the hoofs of horses and other animals, the hoof being provided with a recess extending round its edge, of such a depth and width as to allow the shoe to drop in flush with the sole of said hoof, in such a manner that the animal is enabled to walk on its own sole with much more steadiness and safety than it can on the shoes as generally applied, and at the same time the shoes applied according to this new method form a perfect protection to the hoof.

A represents the hoof of a horse or other animal which is to be protected by a metallic shoe, B. This shoe, instead of being nailed to the bottom surface or sole of the shoe, is let into a recess, $a$, which extends all round the edge of the hoof, as clearly shown in the drawing, and it is fastened in its place by suitable nails or screws, nails being used by preference, such as represented in figs. 3 and 4 of the drawing. The shoe B is made of a narrow strip of steel or iron, somewhat thicker in front and at the ends than in the other parts, and it is curved to fit exactly the recess $a$. The animal is thus enabled to walk on a smooth or slippery surface with perfect safety, and since all parts of the hoof are brought into action, the step of the animal is the same as if it were unshod, the shoe acting simply as a protection for the hoof, and to prevent the same from wearing away by coming in contact with stones or other hard material.

The horse-shoe as described might at need outpass the sole, so that the horse were enabled to tread on its shoe, but this being at once thin and rather elastic, would yield to the movement of the foot. This shoe which outpasses the sole will also be partly lodged in a groove made in the lower part of the outside rind of the hoof.

What I claim as new, and desire to secure by Letters Patent, is—

The method herein described of attaching the shoe to the hoof of a horse or other animal by letting said shoe into a recess cut into the edge of the hoof, substantially in the manner and for the purposes set forth.

PIERRE CHARLIER.

Witnesses:
    EDWARD TUCK,
    DEMOS.